A. BYRD & C. R. TREADWAY.
HARNESS FOR CONTROLLING ANIMALS.
APPLICATION FILED OCT. 6, 1908.

962,890.

Patented June 28, 1910.

WITNESSES:
R. Hamilton
M. Cox

INVENTORS:
A. Byrd and C. R. Treadway,
BY F. G. Fischer,
ATTORNEY.

UNITED STATES PATENT OFFICE.

ATVILL BYRD AND CHARLES R. TREADWAY, OF KANSAS CITY, MISSOURI.

HARNESS FOR CONTROLLING ANIMALS.

962,890.  Specification of Letters Patent. Patented June 28, 1910.

Application filed October 6, 1908. Serial No. 456,395.

*To all whom it may concern:*

Be it known that we, ATVILL BYRD and CHARLES R. TREADWAY, citizens of the United States, residing at Kansas City, in the county of Jackson and State of Missouri, have invented certain new and useful Improvements in Harness for Controlling Animals, of which the following is a specification.

Our invention relates to a harness for controlling animals, and it may be employed to advantage in holding the legs of unruly animals while being shod. It may also be used to advantage to throw and hold animals down preparatory to subjecting them to surgical operations.

The invention embraces one or more operable-ropes whereby the animal may be thrown down and held, one or more self-locking members for holding said operable-ropes taut, so that the animal cannot release itself, and one or more releasing members whereby either the operable-ropes or the self-locking members may be readily detached from the rest of the harness while under strain, to allow the animal to regain its feet.

Figure 1:
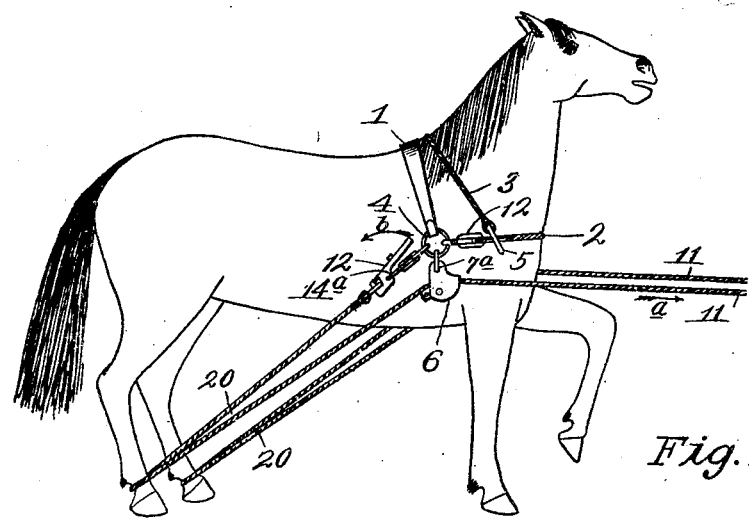
Figure 2:
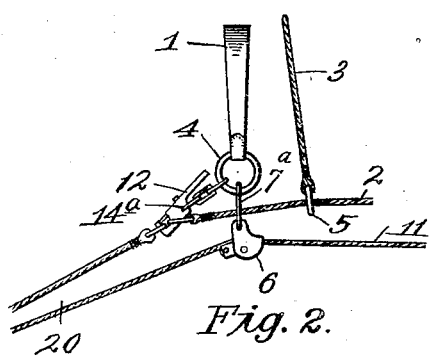
Figure 3:
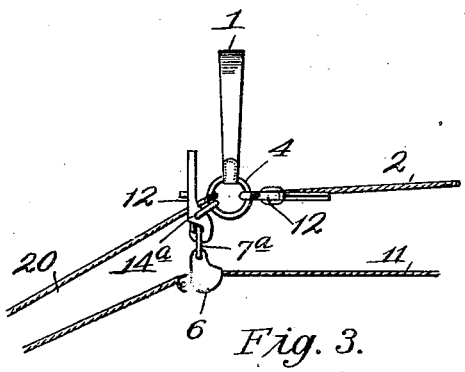
Figure 5:
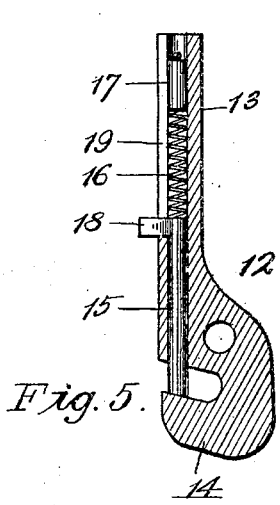
Figure 7:
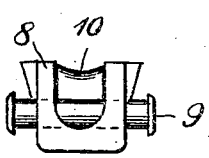
Figure 6:
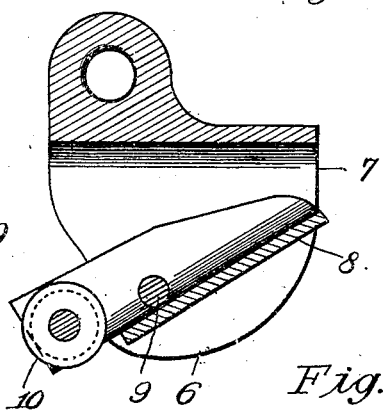
Figure 4:
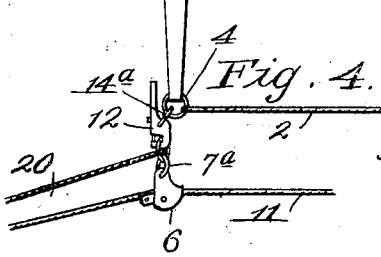

Referring now to the accompanying drawing, which illustrates the invention: Figure 1 shows the harness in position upon an animal. Figs. 2, 3, and 4, are broken side elevations of the harness. Fig. 5 is a vertical section of one of the releasing members. Fig. 6 is a front elevation showing a jaw forming part of the self-locking member. Fig. 7 is a vertical central section of the self-locking member.

In practice we provide the harness with any suitable means for reliably retaining it in position upon the animal, in the drawing we have shown a back-strap 1, a breast-strap 2, and a shoulder-strap 3 for this purpose. The shoulder-strap is not essential and may be dispensed with as shown in Figs. 3 and 4. Each end of the back-strap is provided with a ring 4 to which the rest of the harness, except the shoulder-strap, is attached, said shoulder-strap being provided at its ends with rings 5, which loosely engage and support the forward portion of the breast-strap.

6 designates one of the self-locking members which is employed in throwing and holding the animal down. Each self-locking member consists of a housing 7 and a jaw 8, which latter is pivotally-mounted upon a pin 9 extending transversely through the housing. Jaw 8 is provided at its rear end with an antifriction roller 10, which permits the operable-rope 11 to pass freely through the self-locking member in the direction of arrow $a$, but overbalances the forward end of the jaw and causes the latter to tip upward (Fig. 6), and bite the operable-rope to prevent it from moving backward until the roller-end of the jaw is raised by hand. Housing 7 is provided with a link 7ª, whereby it is connected to a portion of the harness.

12 designates one of the releasing members which is employed in disconnecting the harness to allow the animal to regain its feet. Each releasing member consists of a handle 13, a hook 14 formed integral with said handle, a bolt 15 slidably arranged in the handle, and an expansion spring 16 interposed between said bolt and a plug 17, located in the handle. Bolt 15 is provided with an outturned thumb-piece 18 projecting through a longitudinal slot 19 in the handle, so that said bolt may be readily retracted against the action of spring 16, to disconnect the harness. The releasing members 12 are provided with links 14ª, whereby they are permanently connected to a portion of the harness, preferably to rings 4 of the back-strap.

In practice two sets of operable-ropes, two self-locking members, and two or more releasing members are employed, one set being arranged at each side of the animal, so that should the latter fall upon its side, access may be had to the uppermost set, when it is desired to disconnect the harness to allow the animal to regain its feet. To throw the animal, the operable-ropes are formed into loops 20 to engage the rear fetlock joints, by passing said ropes through the self-locking members and attaching them to the releasing members 12 on the ends of the back-strap, see Fig. 1. The forward ends of the operable-ropes are then pulled upon alternately until the hind legs are drawn beneath the body far enough to throw the animal. The forward ends of the operable-ropes may now be dropped as the self-locking members will hold the loops taut and prevent the animal from freeing itself. To allow the animal to rise it is only necessary to grasp the handle of the uppermost releasing member 12, rotate it in the direction of arrow $b$, and retract the bolt 15 to disengage the rear end of the uppermost operable-rope.

By employing releasing members of the style shown and described, the harness may be disconnected with the greatest ease to allow the animal to arise, without danger of injury either to the animal or the operator. For instance, when the harness is arranged as shown in Fig. 1, one of the loops 20 may be easily and quickly released by first retracting bolt 15 of the releasing member and then rotating the latter in the direction of arrow $b$, when the end of the loop will slip from the hook and thus free the animal. To insure easy rotation of the releasing member, it is desirable to provide a fulcrum therefor, this we have done in the form of links $14^a$ which also form convenient means for securing said releasing member to the rest of the harness.

On certain occasions it is desirable to simultaneously release one end of the breast-strap 2 and one of the loops 20, in which event the breast-strap and the loops are attached to the same releasing members, as shown in Fig. 2. Figs. 3 and 4 show other ways in which the harness may be arranged, hence we do not limit ourselves to any particular way of arranging the harness but broadly claim a harness embodying self-locking members which act while the animal is being thrown or held down, and releasing members independent of the locking members whereby the harness may be readily disconnected while under tension, to allow the animal to arise.

Having thus described our invention, what we claim is:

1. A harness consisting of one or more operable-ropes adapted to be arranged into running loops to engage the fetlock joints of an animal, means for holding said operable-ropes in position upon the animal, self-locking members for holding the loops under tension, and releasing members for relieving the loops of tension, said releasing members being independent of the locking members and provided with integral handles whereby they may be rotated out of engagement with the loops.

2. A harness consisting of a back-strap, a pair of releasing members carried thereby, a breast-strap attached to said releasing members, a pair of self-locking members connected to the back-strap, and a pair of operable-ropes extending through said self-locking members and attached at their rear ends to the releasing members, so that the breast-strap and the end of one of said operable-ropes may be simultaneously disconnected from the harness.

3. A harness consisting of one or more operable-ropes adapted to be arranged into running loops to engage the fetlock joints of an animal, means for holding said operable ropes in position upon the animal, self-locking members for holding the loops under tension, and releasing members for releasing the loops of tension; each of said releasing members being fulcrumed on the harness, and consisting of a hook for engaging one end of the operable rope, a bolt for holding the end of the operable-rope upon the hook, and a handle integral with the hook whereby the latter may be rotated out of engagement with the end of the operable-rope, substantially as described.

In testimony whereof we affix our signatures, in the presence of two witnesses.

ATVILL BYRD.
CHARLES R. TREADWAY.

Witnesses:
M. Cox,
F. E. Ackley.